Patented Jan. 7, 1941

2,227,548

UNITED STATES PATENT OFFICE 2,227,548

PRODUCTION OF A SYNTHETIC RESIN

John H. Long, Marshallton, Del., assignor to Hercules Powder Company, Wilmington, Del., a corporation of Delaware No Drawing. Application May 11, 1938,
Serial No. 207,329

10 Claims. (Cl. 260—25)

My invention relates to an improved resin and to a method for the production thereof.

Heretofore, it has been known to react ester gum with alkali-condensed, phenol-formaldehyde resins to produce modified phenolic resins suitable for use in varnishes and lacquers. The phenol-formaldehyde type resins have little retarding action on the gelation of drying oils under the usual cooking conditions for the production of varnishes, so their use in the production of varnishes is difficult. Ester gum strongly retards the gelation of drying oils, and the reaction product of ester gum with a phenol-formaldehyde resin shows the same property. The reaction product is, therefore, adapted for the production of varnishes and shows the desirable characteristics of the unmodified phenolic resins. The ordinary unmodified phenolic resins are incompatible in lacquer films, when present in useful quantities. However, when such resins are reacted with ester gum they become compatible in lacquer films, and in varnishes, show the desirable characteristics of the unmodified phenol-formaldehyde resins.

The reaction of ester gum with an alkali-condensed phenol-formaldehyde resin increases the melting point of the ester gum in proportion to the amount of phenol-formaldehyde resin used. The ester gum-modified phenolic resins are brittle in nature and their brittleness, like their melting point, increases with the amount of the phenol-formaldehyde resin combined therein. For this reason, not more than about 20% of an alkali-condensed phenolic type resin can ordinarily be combined with ester gum in the production of such modified phenolic resins. The brittleness of the ester gum-modified phenolic resins is a marked disadvantage in many uses and has restricted their use to the production of varnishes and lacquers in which softening ingredients are present.

Now in accordance with this invention I provide a modified phenolic resin which shows the characteristic advantages of the prior art ester gum modified phenolic resins without their important disadvantages, notably, their brittleness, their poor compatibility with certain oils, their poor solubility in certain solvents and their poor retarding effect on the gelation of China-wood oil in the cooking of varnishes. My improved resin is adapted for the production of varnishes and lacquers and, more particularly, is well suited for the production of more highly flexible coatings than is possible with the ester gum modified phenolics.

The improved synthetic resin, in accordance with my invention, comprises the reaction product of an unmodified oil-soluble, alkali-condensed phenol-formaldehyde type resin with a liquid ester of a rosin or a rosin acid.

The esters of rosin which I react to produce my improved synthetic resin may be any ester of rosin which is a liquid at normal room temperatures, i. e., one which has a melting point below about 35° C. It may be, for example, an ester of any of the various grades of wood rosin, American gum rosin, French gum rosin, etc., or abietic acid, pimaric acid, sapinic acid, etc., with a monohydric alcohol, such as, for example, methanol, ethanol, propanol, butanol, amyl alcohol, benzyl alcohol, the monomethyl ether of ethylene glycol, the monoethyl ether of ethylene glycol, etc.

The unmodified, oil-soluble alkali-condensed phenol-formaldehyde type resin used in the production of my improved resin may be any one of the oil-soluble, alkali-condensed synthetic resins made by the reaction of phenol, a substituted phenol or a cresol with an aldehyde or a ketone, in the presence of an alkaline condensing agent. Thus, the resin may be made by the reaction of a phenol or a substituted phenol with formaldehyde, a homologue of formaldehyde, furfural, acrolein, benzaldehyde, crotonaldehyde, acetaldehyde, or the like in the presence of a basic catalyst. The unmodified oil-soluble phenol-formaldehyde type resin which I may use may be, for example, an alkali-condensed para-phenylphenol-formaldehyde resin, an alkali-condensed para-tertiaryamylphenol-formaldehyde resin, etc. The unmodified, oil-soluble, alkali-condensed phenol-formaldehyde resins presently commercially available under the trade names of Super Beckacite 1001, Bakelite XR-3360 and Amberol ST-137 are likewise, suitable for use in the production of my new synthetic resin.

The procedure for the production of my improved synthetic resin, in accordance with this invention, involves heating an unmodified, alkali-condensed, phenol-formaldehyde type resin admixed with a liquid ester of rosin to a temperature within the range of about 175° C. to about 300° C. and preferably within the range of about 200° C. to about 250° C., maintaining the reaction mixture at this temperature until the foaming has stopped, and allowing the product to cool to room temperature.

The relative proportions of the unmodified, alkali-condensed, phenol-formaldehyde type resin and of the liquid ester of rosin which are heated together may be varied over a wide range, and will depend on the hardness desired of the product. The amount of the alkali-condensed phenol-formaldehyde type resin reacted with the ester of a rosin will generally fall within the range of about 10% to about 60% by weight of the mixture and for producing a flexible resin will usually fall within the range of about 10% to about 40% by weight of the mixture.

It will be appreciated that in accordance with this invention I may produce soft, non-brittle resins having a higher phenolic content than can ordinarily be used in the ester gum modified phenolic resins produced heretofore. The liquid rosin esters which I react with the phenolic resin are very alkali-resistant. Thus, the reaction product of the liquid rosin ester and the phenolic resin possesses practically the same alkali-resistance as the unmodified phenolic resin. Thus, in accordance with my invention, I may produce flexible modified phenolic resins with high alkali-resistance in contrast to the hard and brittle prior art ester gum modified phenolic resins. Also, the flexible modified phenolic resin produced in accordance with the invention may be used to make varnishes of low oil content which produce films having a toughness equal to those obtained from ester gum-modified phenolic resin varnishes containing much more oil. Since varnish oils, in general, are very easily saponified, the use of smaller amounts of oil results in varnish films of improved alkali-resistance.

Another advantage of my invention over the prior art is the better compatibility with drying oils and solubility in solvents which my improved modified phenolic resins exhibit. The liquid rosin ester exhibits a co-solvent effect which could not have been anticipated. As a result certain oils and solvents may be used in which the prior art ester gum modified phenolic resins are insoluble. My improved modified phenolic resins also exhibit a greater retarding effect on the gelation of China-wood oil than the prior art ester gum modified phenolic resins and permit greater latitude in the cooking of varnishes.

The product and method, in accordance with this invention, are further illustrated by the following:

An unmodified, alkali-condensed, phenolic resin of the type I utilize was prepared by the procedure which follows:

A mixture of 164 parts by weight of p-tertiary-amylphenol, 113 parts by weight of a 36% by weight aqueous formaldehyde solution and 10 parts by weight of sodium hydroxide disolved in 50 parts by weight of water were heated under reflux for 20 minutes. The alkali was then neutralized by the addition of concentrated hydrochloric acid. The water layer which separated was removed and the resin layer dehydrated and transformed into a hard resin by heating at a temperature up to 120° C. until a cooled sample was hard and clear.

Typical examples of the combination of this phenolic resin with liquid rosin esters, in accordance with this invention, are summarized in the following table:

TABLE I

| Example No. | Phenolic resin | Methyl abietate | Ethyl abietate | Treatment | M. P. drop method |
|---|---|---|---|---|---|
| | Parts by weight | Parts by weight | Parts by weight | | °C. |
| 1 | 20 | 80 | | 20 min. at 220° C. | 33 |
| 2 | 40 | 60 | | do | 74 |
| 3 | 60 | 40 | | do | 112 |
| 4 | 40 | | 60 | do | 64 |

Another oil-soluble, unmodified, alkali-condensed phenolic resin of the type I utilize was prepared by the following procedure:

A mixture of 108 parts by weight of cresol, 66 parts by weight of acetaldehyde, and 10 parts by weight of sodium hydroxide dissolved in 25 parts by weight of water was prepared and allowed to stand at room temperature for 15 hours and then refluxed for 3 hours. The mixture was then heated in an open dish to 175° C. to evaporate the volatile ingredients. The residue on cooling was a semi-hard resin.

Typical examples of the combination of this phenolic resin with liquid esters of abietic acid are summarized in the following table:

TABLE II

| Example No. | Phenolic resin | Methyl abietate | Benzyl abietate | Treatment | Remarks |
|---|---|---|---|---|---|
| | Parts by weight | Parts by weight | Parts by weight | | |
| 5 | 20 | 80 | | 20 min. at 220° C. | M.P. 39° C. |
| 6 | 30 | | 60 | 20 min. at 250° C. | Semi-hard flexible. |

The products and procedure in accordance with this invention are further illustrated by the following examples in which commercially available unmodified, alkali-condensed phenolic resins are reacted with liquid esters of abietic acid:

*Example VIII*

Eighty parts by weight of methyl abietate and 20 parts by weight of the unmodified alkali-condensed type phenolic resin known presently by the trade name of Bakelite XR—3360 were heated together at 200° C. for about 20 minutes when the foaming caused by the reaction had stopped. The reaction product was a light yellow, soft, tacky resin.

Table III summarizes further typical examples in which methyl abietate was combined in different proportions with the unmodified, alkali-condensed type phenolic resin presently known by the trade name of Super Beckacite 1001, and shows the properties of the resins so produced.

TABLE III

| Example No. | Phenolic resin | Methyl abietate | Treatment | Color | M. P. | Properties |
|---|---|---|---|---|---|---|
| | Parts by weight | Parts by weight | | | °C. | |
| 7 | 20 | 80 | 20 min. at 200° C | Light yellow | 45 | Tacky, viscous, adheres to glass. |
| 8 | 40 | 60 | do | do | 97 | Slightly tacky and slightly brittle |
| 9 | 60 | 40 | do | Amber | 138 | Hard and brittle. |

A comparison of the properties of the new resin in accordance with this invention, with a resin made according to the prior art is shown in the table which follows:

taining the same proportion of the said phenol-aldehyde resin.

TABLE IV

| Example No. | Phenolic resin (Super Beckacite 1001) Parts by weight | Methyl abietate Parts by weight | Ester gum Parts by weight | Treatment | M. P. °C. | Properties |
|---|---|---|---|---|---|---|
| 10 | 20 | 80 | | 20 min. at 200° C | 45 | Tacky and flexible. |
| Prior art resin | 20 | | 80 | do | 138 | Hard and brittle. |

In the above table it will be observed that, although exactly the same amounts of methyl abietate and of ester gum, respectively, are reacted with the phenolic resin, under exactly the same conditions of reaction, that the product in accordance with this invention (Example No. 10) is tacky and flexible while the prior art resin is hard and brittle.

It will be understood that the details and examples hereinbefore set forth are illustrative only, and that the invention as herein broadly described and claimed is in no way limited thereby.

This application is a continuation-in-part of my application, Serial No. 96,055, filed by me August 14, 1936.

What I claim and desire to protect by Letters Patent is:

1. A synthetic resin comprising the reaction product of an unmodified, oil-soluble, alkali-condensed resin selected from the group consisting of phenol-aldehyde and phenol-ketone resins, and a liquid monohydric alcohol ester of an acid from the group consisting of rosins and rosin acids, the said synthetic resin being characterized by a substantially lower melting point and by a greater flexibility than a reaction product of the said phenolic resin with ester gum containing the same proportion of the said phenolic resin.

2. A synthetic resin comprising the reaction product of an unmodified, oil-soluble, alkali-condensed, phenol-aldehyde resin and the methyl ester of a rosin, the said synthetic resin being characterized by a substantially lower melting point and by a greater flexibility than a reaction product of the said phenol-aldehyde resin with ester gum containing the same proportion of the said phenol-aldehyde resin.

3. A synthetic resin comprising the reaction product of an unmodified, oil-soluble, alkali-condensed phenol-aldehyde resin and the ethyl ester of a rosin, the said synthetic resin being characterized by a substantially lower melting point and by a greater flexibility than a reaction product of the said phenol-aldehyde resin with ester gum containing the same proportion of the said phenol-aldehyde resin.

4. A synthetic resin comprising the reaction product of an unmodified, oil-soluble, alkali-condensed, phenol-aldehyde resin and the benzyl ester of a rosin, the said synthetic resin being characterized by a substantially lower melting point and by a greater flexibility than a reaction product of the said phenol-aldehyde resin with ester gum containing the same proportion of the said phenol-aldehyde resin.

5. A synthetic resin comprising the reaction product of an unmodified oil-soluble, alkali-condensed phenol-aldehyde resin and methyl abietate, the said synthetic resin being characterized by a substantially lower melting point and by a greater flexibility than a reaction product of the said phenol-aldehyde resin with ester gum containing the same proportion of the said phenol-aldehyde resin.

6. A synthetic resin comprising the reaction product of an unmodified, oil-soluble, alkali-condensed, phenol-aldehyde resin and a liquid monohydric alcohol ester of an acid from the group consisting of rosins and rosin acids, said synthetic resin containing within the range of about 10 per cent to about 60 per cent by weight of the phenol-aldehyde resin, and the said synthetic resin being characterized by a substantially lower melting point and by a greater flexibility than a reaction product of the said phenol-aldehyde resin with ester gum containing the same proportion of the said phenolic resin.

7. A synthetic resin comprising the reaction product of an unmodified, oil-soluble, alkali-condensed, phenol-aldehyde resin and a liquid monohydric alcohol ester of an acid from the group consisting of rosins and rosin acids, said synthetic resin containing within the range of about 10 per cent to about 40 per cent by weight of the phenol-aldehyde resin and the said synthetic resin being characterized by a substantially lower melting point and by a greater flexibility than a reaction product of the said phenol-aldehyde resin with ester gum containing the same proportion of the said phenol-aldehyde resin.

8. The method of producing a synthetic resin which comprises heating an unmodified, oil-soluble, alkali-condensed resin selected from the group consisting of phenol-aldehyde and phenol-ketone resins, with a liquid monohydric alcohol ester of an acid from the group consisting of rosins and rosin acids to effect formation of a synthetic resin characterized by a substantially lower melting point and by a greater flexibility than a reaction product of the said phenolic resin with ester gum containing the same proportion of the said phenolic resin.

9. The method of producing a synthetic resin which comprises heating an unmodified, oil-soluble, alkali-condensed phenol-aldehyde resin with a liquid monohydric alcohol ester of an acid from the group consisting of rosins and rosin acids to a temperature within the range of about 175° C. to about 300° C. to give a synthetic resin characterized by a substantially lower melting point and by a greater flexibility than a reaction product of the said phenol-aldehyde resin with ester gum containing the same proportion of the said phenol-aldehyde resin.

10. The method of producing a synthetic resin which comprises heating an unmodified, oil-soluble, alkali-condensed phenol-aldehyde resin with a liquid monohydric alcohol ester of an acid from the group consisting of rosins and rosin acids to a temperature within the range of about 200° C. to about 250° C. to give a synthetic resin characterized by a substantially lower melting point and by a greater flexibility than a reaction product of the said phenol-aldehyde resin with ester gum containing the same proportion of the said phenol-aldehyde resin.

JOHN H. LONG.